United States Patent
Ogawa et al.

(10) Patent No.: US 8,619,448 B2
(45) Date of Patent: Dec. 31, 2013

(54) POWER CONVERTER AND MOTOR DRIVING DEVICE USING THE SAME

(75) Inventors: Kazutoshi Ogawa, Hitachi (JP); Katsumi Ishikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 13/176,776

(22) Filed: Jul. 6, 2011

(65) Prior Publication Data
US 2012/0007533 A1    Jan. 12, 2012

(30) Foreign Application Priority Data
Jul. 6, 2010    (JP) .................................. 2010-153687

(51) Int. Cl.
*H02M 7/5387*    (2007.01)
(52) U.S. Cl.
USPC ........................................... 363/132; 363/40
(58) Field of Classification Search
USPC ........................................... 363/40, 131, 132
See application file for complete search history.

(56) References Cited

U.S. PATENT DOCUMENTS

| 7,576,521 B2* | 8/2009 | Komiya ........................ 323/268 |
| 2002/0171985 A1* | 11/2002 | Duffy et al. ..................... 361/90 |
| 2009/0278513 A1* | 11/2009 | Bahramian et al. ........... 323/217 |

FOREIGN PATENT DOCUMENTS

| JP | 2008-092663 | 4/2008 |
| JP | 2009-225570 | 10/2009 |

* cited by examiner

*Primary Examiner* — Harry Behm
*Assistant Examiner* — Matthew Grubb
(74) *Attorney, Agent, or Firm* — Antonelli, Terry, Stout & Kraus, LLP.

(57) ABSTRACT

In order to reduce the average power of the ringing noise, the present invention provides a power converter comprising: an arm circuit including a high-voltage side switching device to which a first diode is connected in parallel and a low-voltage side switching device to which a second diode is connected in parallel; and a main power supply connected to a series circuit of the high-voltage side switching device and the low-voltage side switching device, wherein a connecting point between the high-voltage side switching device and the low-voltage side switching device is connected to a load, and a resonant frequency calculated from inductances of wirings of a closed circuit including the first diode, the second diode, and the main power supply and a capacitance across the first diode is different form that calculated from the inductances of the wirings and a capacitance across the second diode.

12 Claims, 8 Drawing Sheets

POWER CONVERTER AND MOTOR DRIVING DEVICE USING THE SAME

CROSS REFERENCE TO RELATED APPLICATION

This application claims priority under 35 U.S.C. §119 to Japanese Patent Application No. 2010-153687 filed on Jul. 6, 2010, the disclosure of which is incorporated herein by reference.

BACKGROUND OF THE INVENTION

1. Field of the Invention

The present invention relates to a power converter using a plurality of parallel circuits composed of switching devices and diodes and a motor driving device using the power converter, and more particularly to an inverter circuit in which a Schottky barrier diode (SBD) of large bandgap semiconductors such as SiC, and GaN, etc. is used for a diode connected to a power semiconductor switching device in parallel.

2. Description of the Related Art

In recent years, semiconductor devices made of a silicon carbide (SiC) or a gallium nitride (GaN) have attracted attention as wide gap semiconductor devices. Since these materials have dielectric breakdown field strengths which are about ten times larger than that of a silicon (Si) and the thickness of a drift layer to keep resistance to voltage can be reduced to about one-tenth of that of a silicon (Si), an on-voltage of a power device can be lowered. For this reason, even in a high-voltage domain in which only a bipolar device can be used if the device is made of Si, a unipolar device can be used if the device is the wide gap semiconductor device made of SiC, etc.

In a power semiconductor module used for an inverter circuit, a free wheel diode is connected to a switching device in parallel. In a conventional power semiconductor module, a Si-PiN diode is used as the free wheel diode. The Si-PiN diode is a bipolar semiconductor device, and is configured so that a conductivity modulation causes a voltage drop to be small when a large current is supplied in a forward bias direction. However, the Si-PiN diode has the property of generating carriers remained in the Si-PiN diode as a reverse recovery current by the conductivity modulation during a process from a forward bias condition to a reverse bias condition. In the Si-PiN diode, since a lifetime of the remaining carrier is long, the reverse recovery current becomes large. For this reason, there arises a problem that this reverse recovery current causes a turn-on loss (Eon) and a recovery loss (Err) at the time of reverse recovery of a diode to be large.

On the other hand, a Schottky barrier diode (SBD) is an unipolar semiconductor device. Since few carriers are generated by the conductivity modulation and the reverse recovery current is very small, the turn-on loss and the recovery loss can be reduced when the SBD is used in an inverter circuit. Also, the conventional Si has a low dielectric breakdown field strength, and a large resistance is generated when the SBD is energized if the SBD is made to have a high voltage structure. Therefore, a voltage limit of a Si-SBD is about 200 V. However, since the SiC has the dielectric breakdown field strength which is ten times larger than that of the Si, a high-voltage SBD can be realized. Therefore, it is well known that the turn-on loss (Eon) and the recovery loss (Err) at the time of reverse recovery of a diode can be reduced.

Also, in a main circuit of an inverter of a power semiconductor module using a conventional Si-PiN diode, a commutation surge voltage ($\Delta Vp = L \ast$ reverse recovery di/dt) obtained by product of change in reverse recovery current of the Si-PiN diode at the time of attenuation (reverse recovery di/dt) and an inductance L of the main circuit is added. If the sum ($E+\Delta Vp$) of a power supply voltage (E) and a surge voltage ($\Delta Vp$) is greater than a withstand voltage of the power semiconductor switching device, the power semiconductor device may be destroyed. For this reason, various techniques for reducing the inductance and noise of the main circuit have been proposed.

For example, JP 2009-225570 A discloses a technique for reducing the noise by connecting an impedance between a terminal of a free wheel diode connected to a switching device in parallel and a terminal of the switching device.

JP 2008-092663 A discloses a technique for reducing the noise by changing a gate resistance in a driving circuit of IGBT (Insulated Gate Bipolar Transistor) during a turn-on period.

By the way, as described above, since the reverse recovery current does not flow through the Schottky barrier diode made of SiC (SiC-SBD), etc., the turn-on loss and the recovery loss are essentially small. Also, since there is no reverse recovery di/dt, it is possible to increase a switching speed (turn-on speed) of the switching device by decreasing the gate resistance of the power semiconductor switching device. For this reason, it is possible to reduce the loss further.

However, the SiC-SBD has some junction capacitance. Therefore, when the switching device is turned on, the power supply voltage is applied to both terminals of the diode, and a resonant current flows caused by the junction capacitance of the diode and the inductance of the main circuit. That is, the SiC-SBD has a disadvantage that a large surge voltage (ringing voltage) is applied to both terminals of the diode, so that a ringing noise is increased.

Also, in an EMC (Electro-Magnetic Compatibility) noise measurement for an electromagnetic interference (EMI) countermeasure, a target frequency is changed, and a spectral distribution for indicating a noise intensity of the target frequency is measured. This spectral distribution can be calculated by using FFT (Fast Fourier Transform) in at least low frequency domain. In the calculation, the noise intensity (power) is sequentially integrated for a predetermined period. For this reason, in order to reduce the noise generated by an apparatus, a peak value of the noise intensity is not necessarily suppressed, an average power within a predetermined period may be decreased.

SUMMARY OF THE INVENTION

In light of the above, an object of the present invention is to provide a power converter which can reduce the average power of the ringing noise, and a motor driving device using the power converter.

In order to achieve the above object, the present invention provides a power converter (30) comprising: an arm circuit including a high-voltage side switching device (11a) to which a first diode (5a) is connected in parallel and a low-voltage side switching device (11b) to which a second diode (5b) is connected in parallel; and a main power supply (1) connected to a series circuit of the high-voltage side switching device and the low-voltage side switching device, wherein a connecting point between the high-voltage side switching device and the low-voltage side switching device is connected to a load, and a resonant frequency calculated from inductances of wirings (23, 24) of a closed circuit including the first diode, the second diode, and the main power supply and a capacitance across the first diode is different form that calculated from the inductances of the wirings and a capacitance across the second diode. The reference numbers in parentheses are merely illustrative.

When the arm circuit is composed of two switching devices (i.e., the high-voltage side switching device and the low-voltage side switching device), one switching device is on while the other switching device is off. Therefore, two switching devices change in reverse directions at the same time. At this moment, since a resonant frequency calculated from inductances of wirings of a closed circuit including the first diode, the second diode, and the main power supply and a capacitance across the first diode is different form that calculated from the inductances of the wirings and a capacitance across the second diode, a spectral distribution of a resonant current is dispersed. For this reason, a peak value at the resonant frequency is decreased. In other words, resonant frequencies of resonant systems through which resonant currents flow are not equalized, but the resonant systems are made to have original resonant frequencies respectively. As a result, the peak values of the resonant frequencies are dispersed and decreased. In addition, capacitances across the first and diodes are junction capacitances.

Also, a motor driving device of the present invention comprises: a power converter in which the n number of arm circuits are connected in parallel, and the resonant frequencies have the (2*n) number of different values; and a polyphase motor connected to the n number of connecting points as a load, wherein the main power supply is connected to the n number of series circuit commonly.

Since any two of the n number of arm circuits connected in parallel do not change at the same time, the ringing noises are not superimposed. However, for a predetermined period longer than a cycle of a rectangular wave voltage applied to the polyphase motor, an average power obtained by integrating the ringing noise is superimposed on n number of ringing noises. At this moment, since the spectral distribution of the average power is dispersed, the peak value is decreased.

According to the present invention, the peak value of the average power of the ringing noise can be decreased. Also, it becomes possible to decrease the peak values of the noises without increasing a switching loss.

DETAILED DESCRIPTION OF THE PREFERRED EMBODIMENT

First Embodiment

Hereinafter, with reference to drawings, basic configurations of motor driving devices according to embodiments of the present invention will be explained. Next, characterizing portions of embodiments will be explained. Note that the same numerical references are used for the same components, and detailed descriptions will be omitted.

(Basic Configuration)

Figure 1:
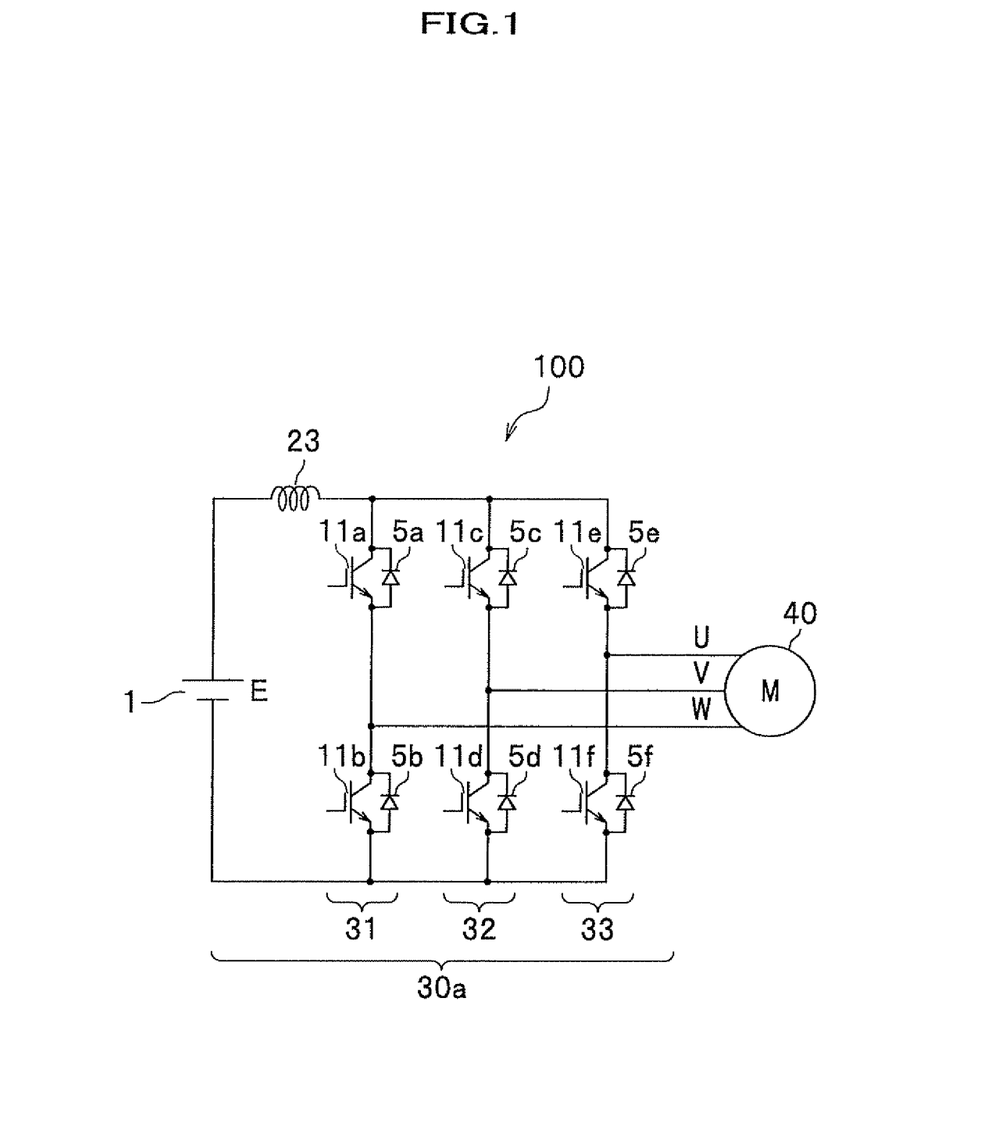
FIG. 1 is a circuit diagram showing a basic configuration of a motor driving device according to a first embodiment of the present invention.

FIG. 1 is a circuit diagram showing a basic configuration of a motor driving device according to a first embodiment of the present invention.

In the circuit diagram of FIG. 1, a motor driving device 100 includes an inverter circuit 30a as a power converter, and a three-phase motor 40 as a load of the power converter. The inverter circuit 30a includes a DC power supply 1 as a main power supply, three of switching circuits 31, 32, 33, and an inductor 23. The switching circuits 31, 32, 33 have a configuration in that two of IGBTs 11 as switching devices are connected in series, and a connecting point between an IGBT 11a as a high-voltage side switching device and an IGBT 11b as a low-voltage side switching device is connected to a W-phase of the three-phase motor 40 as a polyphase motor. Likewise, a connecting point between an IGBT 11c and an IGBT 11d is connected to a V-phase of the three-phase motor 40, and a connecting point between an IGBT 11e and an IGBT 11f is connected to an U-phase of the three-phase motor 40.

Also, diodes 5 (5a, 5b, 5c, 5d, 5e, 5f) are connected to the IGBTs 11 (11a, 11b, 11c, 11d, 11e, 11f) as free wheel diodes in parallel respectively. That is, a collector terminal of the IGBT 11 is connected to a cathode terminal of the diode 5, and an emitter terminal of the IGBT 11 is connected to an anode terminal of the diode 5. In addition, the diodes 5a, 5c, 5e connected to the IGBTs 11a, 11c, 11e belong to a first diode, and the diodes 5b, 5d, 5f connected to the IGBTs 11b, 11d, 11f belong to a second diode.

The DC power supply 1 has an output voltage E, may be a switching power supply using a commercial power supply, and may be a primary battery or a secondary battery.

The IGBT 11 is a three-terminal semiconductor device having a gate terminal, a collector terminal, and an emitter terminal, and can control a collector current using a gate voltage.

The diode 5 is a two-terminal semiconductor device having an anode terminal and a cathode terminal, and a current flows from the anode terminal to the cathode terminal in only one direction. As described above, the diode 5 is preferably the Schottky barrier diode (SBD) whose recovery current is small. However, The diode may be a Si-Pin diode.

The inductor 23 indicates an impedance of wirings of a closed circuit (main circuit) including the IGBTs 11a, 11b and the DC power supply 1.

The three-phase motor 40 is so-called a three-phase brushless motor, in which a plurality of permanent magnets are used for a rotor (not shown) and electromagnets whose number is multiples of 3 are cylindrically arranged for a stator (not shown). These electromagnet are connected by Delta-connection or Y-connection, and wirings of the U-phase, the V-phase, and the W-phase are connected to the out side. By applying the three-phase alternating current to the U-phase, the V-phase, and the W-phase of the three-phase motor 40, a rotating magnetic field is generated in the stator, and the rotor is rotated.

Figure 2:
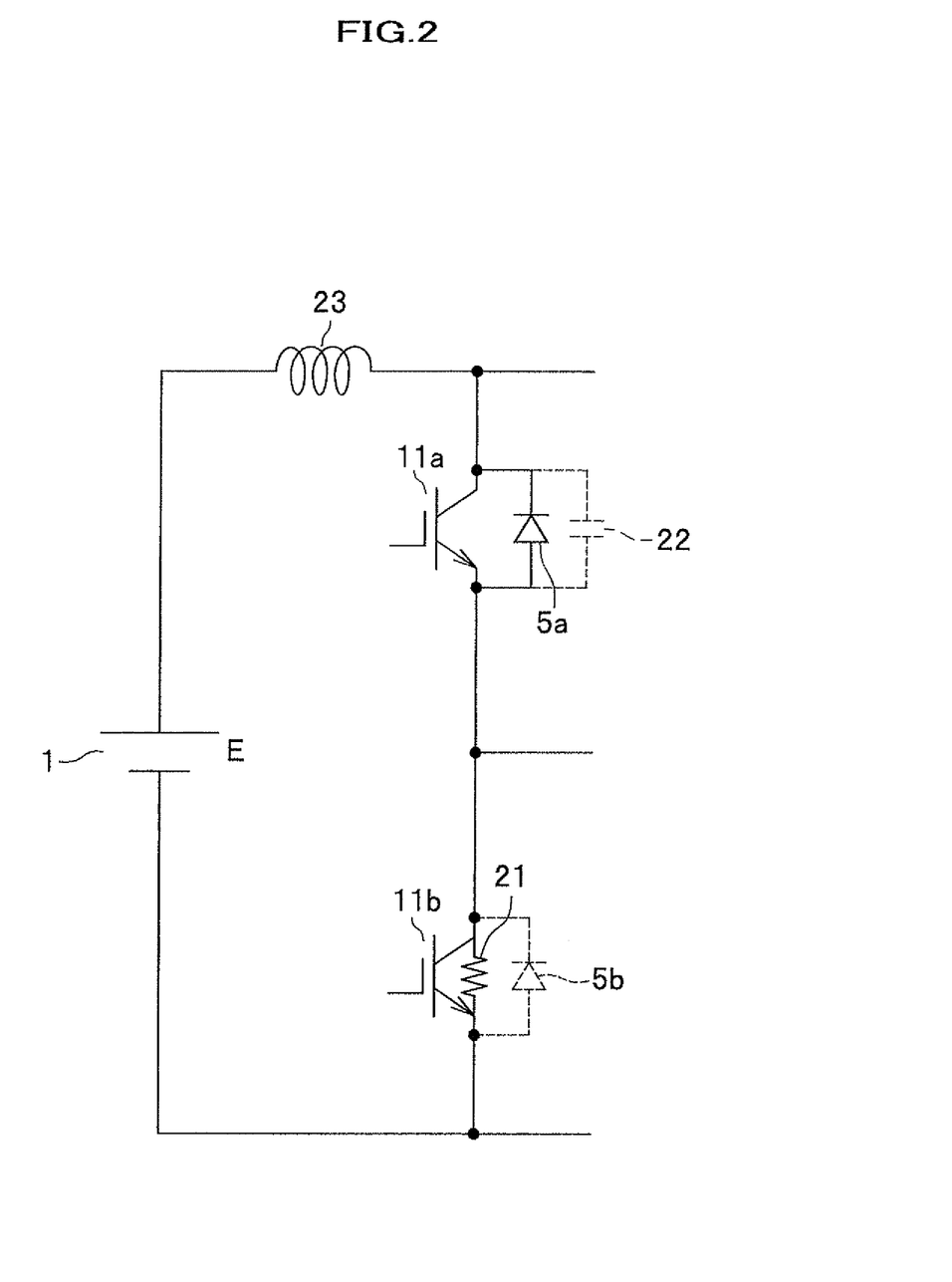
FIG. 2 is a circuit diagram showing an equivalent circuit at the time of occurrence of a ringing noise caused by a junction capacitance.
Figure 4:
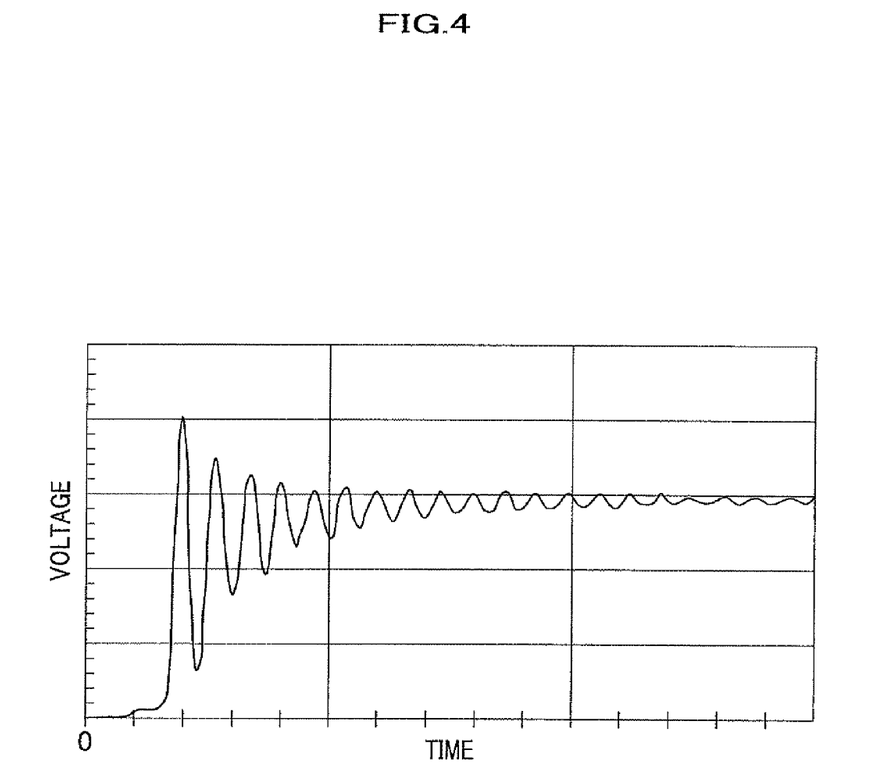
FIG. 4 is a diagram showing an example of a waveform of the ringing noise.

FIG. 2 is a circuit diagram showing an equivalent circuit at the time of occurrence of a ringing noise caused by a junction capacitance, and FIG. 4 is a diagram showing a terminal voltage waveform (ringing waveform) of the diode 5. The equivalent circuit of FIG. 2 shows only a switching circuit 31 for one-phase component for the sake of simplicity.

For example, when the high-voltage side IGBT 11a changes from ON to OFF and the low-voltage side IGBT 11b changes from OFF to ON, the IGBT 11b can be equivalently regarded as a resistor 21, and the diode 5a can be regarded as a capacitor 22 because of the junction capacitance. In addition, the capacitor 22 is shown by a dashed line since it is shown as an equivalent circuit of the diode 5a. A resonant current i(t) at this moment can be expressed as follows.

$$i(t)=E/(\beta*L)*e^{-\alpha t}*\sin(\beta*t) \quad (1)$$

where $\alpha=R/(2*L)$, $\beta=(1/(L*C)-\alpha^2)^{1/2}$, R is the resistance value of the resistor 21, C is the capacitance of the capacitor 22, and L is the inductance of the inductor 23.

Also, when the high-voltage side IGBT 11a changes from OFF to ON, and the low-voltage side IGBT 11b changes from ON to OFF, the IGBT 11a can be equivalently regarded as the resistor 21, and the diode 5b can be regarded as the capacitor 22 shown by the dashed line. For this reason, the resonant current flows in reverse direction.

Figure 3:
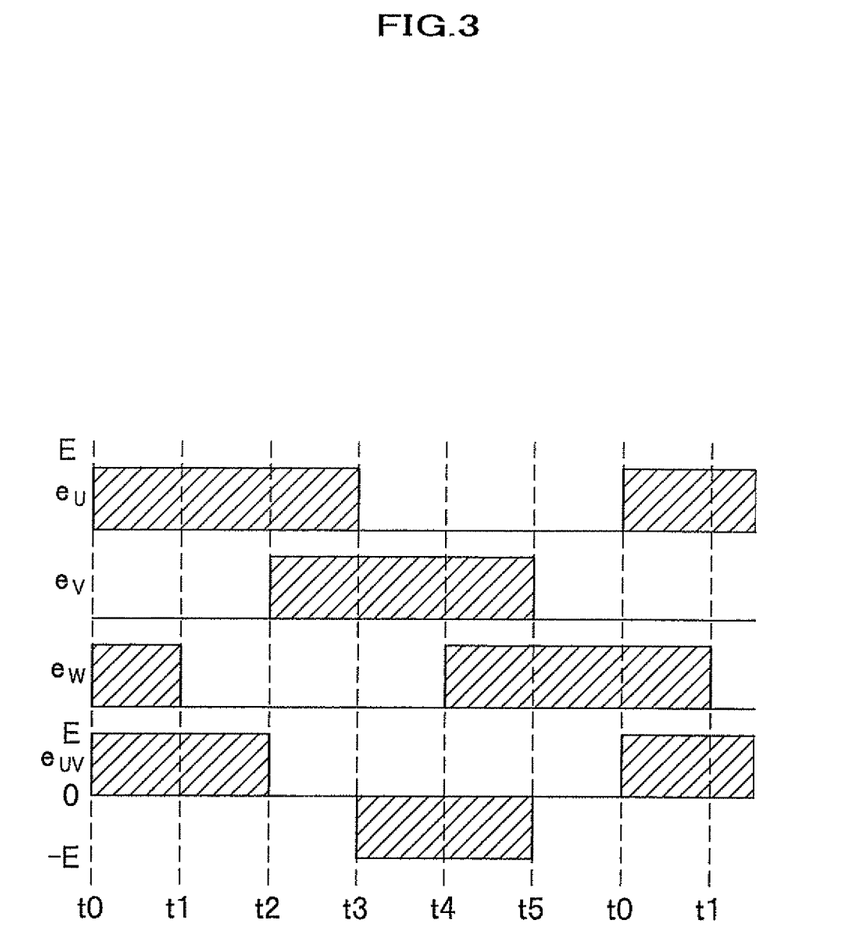
FIG. 3 is a diagram showing phase voltage waveforms and line-to-line voltage waveforms of a three-phase motor.

FIG. 3 is a diagram showing phase voltage waveforms and line-to-line voltage waveforms of the three-phase motor.

From the top, examples of a voltage waveform of the U-phase, a voltage waveform of the V-phase, and a voltage waveform of the W-phase are shown. At the bottom, a line-to-line voltage waveform between the U-phase and the V-phase is shown. The vertical axis represents voltage, and the horizontal axis represents time for every (⅙) cycle. In this example, no PWM modulation is performed.

When the IGBT 11a is turned on and the IGBT 11b is turned off at t=t0, a potential $e_U$ of the W-phase rises to the power supply voltage E. The IGBT 11a is turned off and the IGBT 11b is turned on at t=t3, and the potential $e_U$ of the W-phase rises to 0.

Also, the IGBT 11c is turned on and the IGBT 11d is turned off at t=t2. For this reason, a potential $e_V$ of the V-phase rises to the power supply voltage E. Also, the IGBT 11c is turned off and the IGBT 11d is turned on at t=t5. For this reason, the potential $e_V$ rises to 0.

Also, the IGBT 11e is turned on and the IGBT 11f is turned off at t=t4. For this reason, a potential $e_W$ of the W-phase rises to the power supply voltage E. Also, the IGBT 11d is turned off and the IGBT 11f is turned on at t=t1. For this reason, the potential $e_W$ rises to 0.

As a result, a line-to-line voltage $e_{UV}$ which is a difference between the potential $e_U$ of the U-phase and the potential $e_V$ of the V-phase is kept at a line-to-line voltage E from t=t0 to t=t2, is kept at a line-to-line voltage 0 from t=t2 to t=t3, is kept at a line-to-line voltage −E from t=t3 to t=t5, and is kept at the line-to-line voltage 0 from t=t5 to t=t0. That is, since two intervals of the line-to-line voltage 0 are inserted, harmonic contents of the line-to-line voltage waveform are less than those of a square waveform.

Also, as shown in FIG. 3, since changes of the phase voltages $e_U$, $e_V$, $e_W$ do not occur at the same time, the ringing voltage and the resonant current do not occur at the same time.

Each time the IGBT 11 changes from ON to OFF as the switching device, the resonant current flows, the ringing voltage occurs in the terminal voltage of the diode 12, and noise levels in a resonant frequency band is increased. Also, when a three-phase inverter circuit is made as shown in FIG. 1, the IGBTs 11a, 11b, 11c, 11d, 11e, 11f do not change at the same time, and the ringing voltages of the circuits are approximately equal to one another. For this reason, although the noise intensity is not changed, the average power is superimposed as a time integral of the noise, and the noise level in the resonant frequency band is increased.

FIG. 4 is a diagram showing an example of a waveform of the ringing noise. The vertical axis represents voltage, and the horizontal axis represents time. When the voltage rises in a step pattern, the ringing voltage is superimposed.

(Characterizing Portion)

Figure 5:
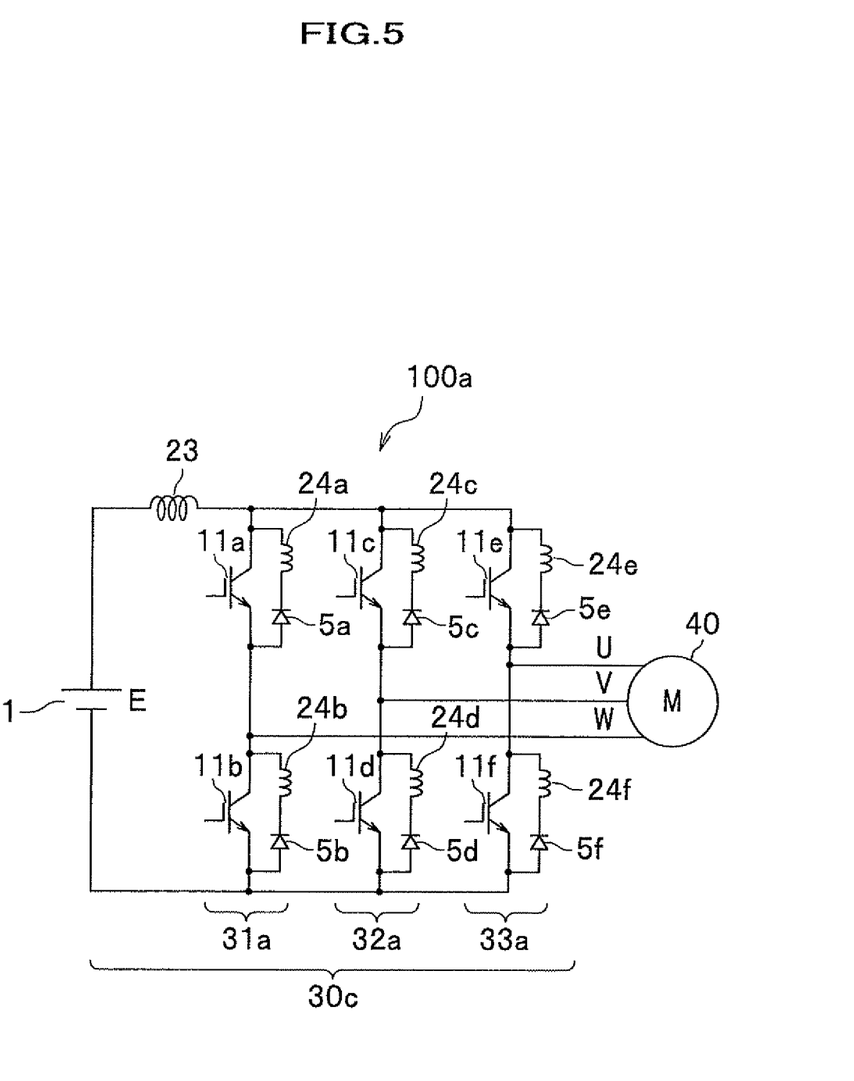
FIG. 5 is a circuit diagram including a characterizing portion of the motor driving device according to the first embodiment of the present invention.

FIG. 5 is a circuit diagram including a characterizing portion of the motor driving device according to the first embodiment of the present invention.

A motor driving device 100a shown in FIG. 5 differs from the motor driving device 100 shown in FIG. 1 in that inductors 24 (24a, 24b, 24c, 24d, 24e, 24f) whose inductances are different from one another are connected to diodes 5a, 5b, 5c, 5d, 5e, 5f in series respectively. That is, a closed circuit is formed by the IGBT 11a, the diode 5, and the inductor 24. For this reason, the resonant frequencies determined by the junction capacitances of the diodes 5 and the inductances of the inductor 23 and the inductors 24 are different from one another. In other words, the resonant frequency calculated from the capacitance of the junction capacitance of the diode 5a and the inductance of the wirings of the closed circuit including the inductor 23, the inductor 24a, the diode 5a, the IGBT 11b, and the DC power supply 1 is different form that calculated from the capacitance of the junction capacitances of the diodes (11b, 11c, 11d, 11e, 11f) and the inductance of the wirings (the inductor 23 and the inductor 24a). For this reason, frequency bands of the resonant frequencies calculated from the inductance of inductors including the inductor 23 are different from one another.

Figure 6A:
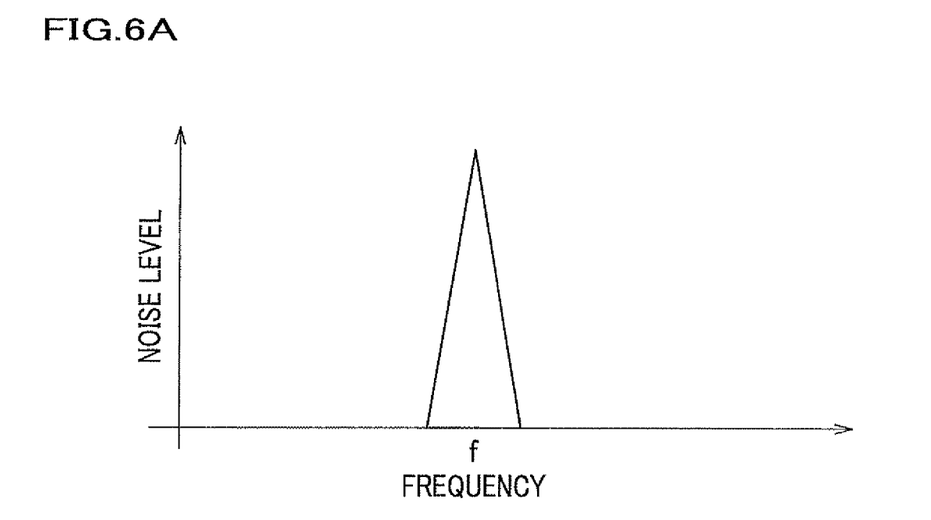
FIG. 6A is a diagram showing a radiant noise level of a conventional art.
Figure 6B:
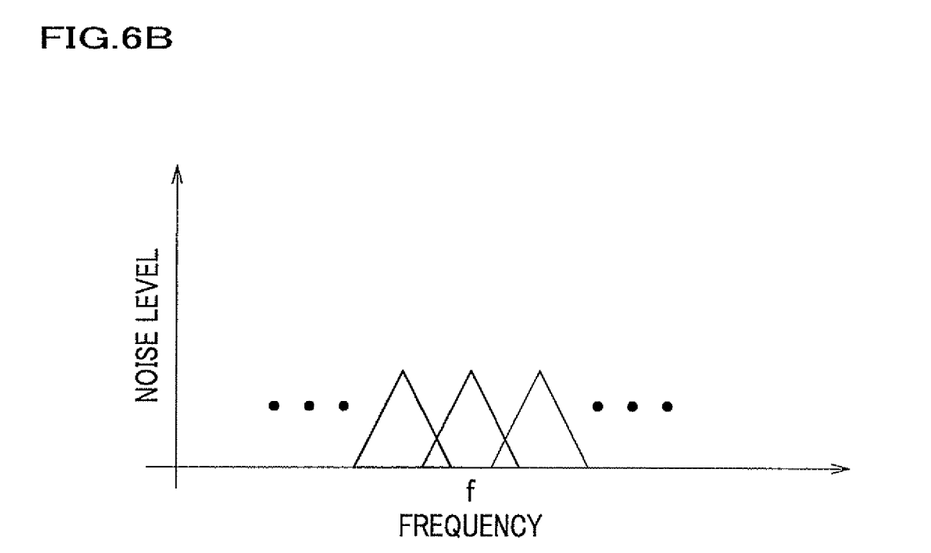
FIG. 6B is a diagram showing a radiant noise level of the first embodiment of the present invention.

FIG. 6A is a diagram showing a radiant noise level of a conventional art. FIG. 6A is a diagram showing a radiant noise level of the first embodiment of the present invention.

The vertical axis represents a noise level (average power), and the horizontal axis represents frequency f. Also, in the conventional art in which the inductor 24 is not provided, components are mounted so that resonant frequencies of all of the resonant systems are approximately comparable. Therefore, the noise levels are superimposed, and a large peak value appears at a resonant frequency f0. On the other hand, when the inductors 24 (24a, 24b, 24c, 24d, 24e, 24f) which are the characterizing portion of this embodiment are applied to the motor driving device, the resonant frequencies are dispersed, and the peak value of the noise level is decreased.

Also, the dispersion of the resonant frequencies may be within a range of (½) times to 2 times, preferably (½)$^{1/2}$ times to $2^{1/2}$ times.

Second Embodiment

Figure 7:
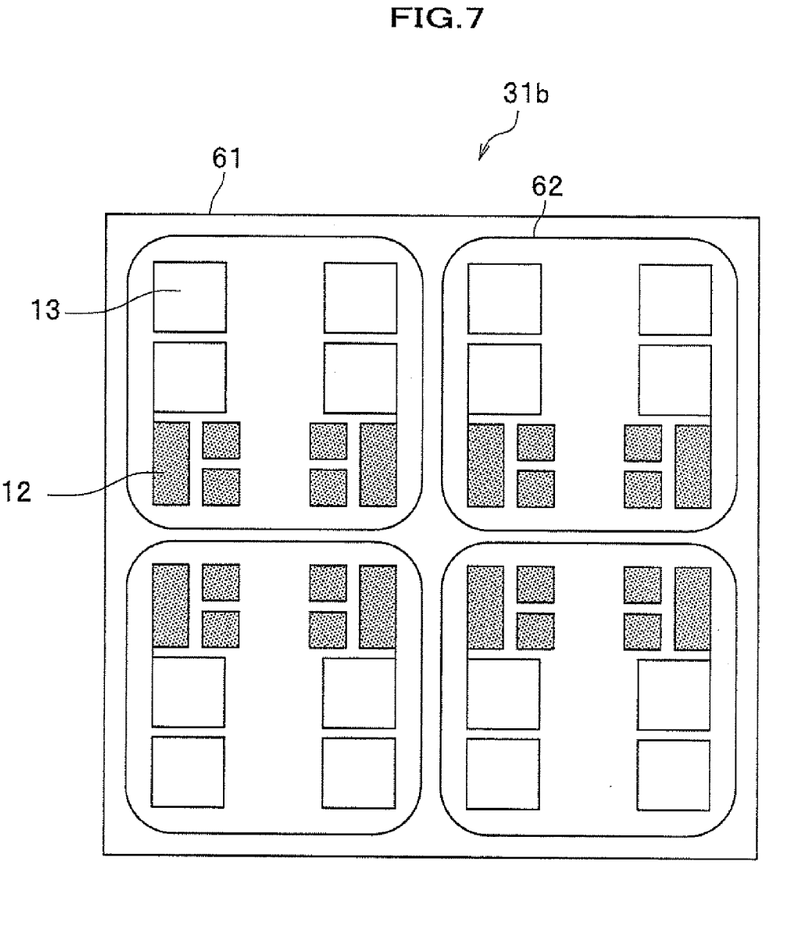
FIG. 7 is a plan view of a semiconductor module used for a motor driving device according to a second embodiment of the present invention.

FIG. 7 is a plan view of a semiconductor module used for a motor driving device according to a second embodiment of the present invention.

Although the configuration of the motor driving device according to this embodiment is the same as that of FIG. 1, a plurality of IGBT chips 13 and diode chips 12 are connected in parallel on an insulated substrate in a semiconductor module 31b as the switching circuit.

Also, in the semiconductor module 31b, four insulated substrates 62 are mounted on a heat radiation base 61, and all of the insulated substrates 62 are connected in parallel. When the inverter circuit shown in FIG. 1 is made, six semiconductor modules shown in FIG. 7 are used.

By using SiC and GaN diode chips 12 whose sums of chip areas are different for each module, the resonant frequencies calculated from the inductances of the wirings and capacitances across the diodes 5b, 5c, 5d, 5e, 5f are different from one another. For this reason, peak frequencies of the noise levels are dispersed, and the peak values of the radiant noises are decreased.

Also, since the SiC diode is used for the diode 12, the recovery current can be ignored, and only the junction capacitance may be considered.

Also, in this embodiment, although it is possible to disperse the resonant frequencies calculated from the impedance of the inductor 23 and the junction capacitances, it is also possible to disperse the resonant frequencies calculated from the inductances of the wirings to connect between the IGBTs 13 and between the diodes 12 in parallel and the junction capacitances of the diodes 12.

Third Embodiment

Figure 8:
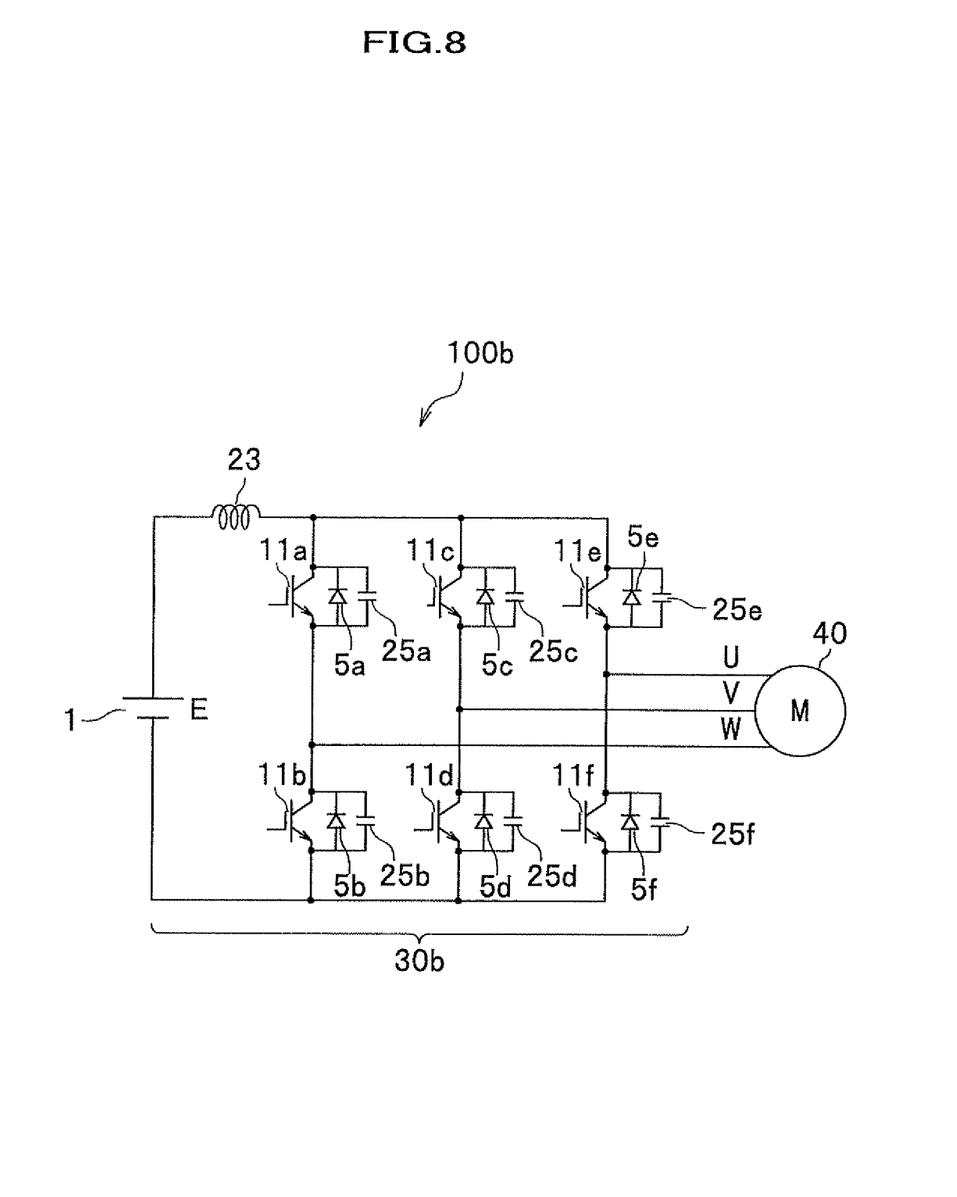
FIG. 8 is a circuit diagram including a characterizing portion of a motor driving device according to a third embodiment of the present invention.

FIG. 8 is a circuit diagram including a characterizing portion of a motor driving device according to a third embodiment of the present invention.

A motor driving device 100b shown in FIG. 8 differs from the motor driving device 100 shown in FIG. 1 in that capacitors 25a, 25b, 25c, 25d, 25e, 25f whose capacitances are different from one another are connected to the diodes 5a, 5b, 5c, 5d, 5e, 5f. By connecting external capacitors 25a, 25b, 25c, 25d, 25e, 25f, the resonant frequencies calculated from the inductance of the inductor 23 and total capacitance of the junction capacitances of the diodes 5 and capacitances of the external capacitors are different from one another. For this reason, the peak values are dispersed and the peak values of the radiant noises are decreased.

Modified Embodiment

The embodiments of the present invention are not limited to the above described embodiments. For example, the following modifications and variations of this invention are possible.

(1) Although the inverter circuit 30 drives the three-phase motor 40 in the above embodiments, it is possible to apply the present invention to a general power converter such as a DC/AC converter, and an AC/AC converter, etc. That is, it is possible to apply the present invention to the power converter used for a train, an elevator, etc., only if the free wheel diode is connected to the switching device in parallel.

(2) Although three-phase power converters are discussed in the above embodiments, it is possible to apply the present invention to a single-phase power converter. That is, it is possible to construct a power converter including the DC power supply 1, the IGBTs 11a and 11b, the diodes 5a and 5b, the inductor 23, the inductors 24a and 24b, and the capacitors 25a and 25b. In this case, for example, it is thought that a series circuit of a diode and an electrolytic capacitor is connected to a connecting point between the IGBTs 11a and 11b, a load is connected to the electrolytic capacitor in parallel, and a DC/DC converter is constructed.

(3) Although the IGBTs are used for the switching device in the above embodiments, FETs, bipolar transistors, and thyristors (SCR) may be used for the switching device. In addition, if FETs are used for the switching circuit, the switching circuit is constructed as a series circuit of p-MOS transistor and a n-MOS transistor.

What is claimed is:

1. A power converter comprising:
an arm circuit including a high-voltage side switching device to which a first diode is connected in parallel and a low-voltage side switching device to which a second diode is connected in parallel; and
a main power supply connected to a series circuit of the high-voltage side switching device and the low-voltage side switching device,
wherein a connecting point between the high-voltage side switching device and the low-voltage side switching device is connected to a load, and a resonant frequency calculated from inductances of wirings of a closed circuit including the first diode, the second diode, and the main power supply and a first capacitance across the first diode is different from that calculated from the inductances of the wirings and a second capacitance across the second diode, and
wherein inductors whose inductances are different from one another are connected to the first diode and the second diode in series respectively, the wiring includes any one of the inductors, and the first capacitance across the first diode and the second capacitance across the second diode are junction capacitances.

2. The power converter according to claim 1, wherein the arm circuit is mounted on an insulated substrate, and a chip area of the first diode is different from that of the second diode.

3. The power converter according to claim 1, wherein the arm circuit is mounted on an insulated substrate, the first diode and the second diode include a plurality of diode chips respectively, and
a chip area of the first diode is different from that of the second diode.

4. The power converter according to claim 1, wherein capacitors whose capacitances are different from one another are connected to the first diode and the second diode in parallel respectively.

5. The power converter according to claim 1, wherein the first diode and the second diode are Schottky barrier diodes made of materials whose bandgaps are larger than that of a silicon.

6. The power converter according to claim 5, wherein the material comprises one of a silicon carbide or a gallium nitride.

7. A power converter comprising:
an arm circuit including a high-voltage side switching device to which a first diode is connected in parallel and a low-voltage side switching device to which a second diode is connected in parallel; and
a main power supply connected to a series circuit of the high-voltage side switching device and the low-voltage side switching device,
wherein a connecting point between the high-voltage side switching device and the low-voltage side switching device is connected to a load, and a resonant frequency calculated from inductances of wirings of a closed circuit including the first diode, the second diode, and the main power supply and a first capacitance across the first diode is different from that calculated from the inductances of the wirings and a second capacitance across the second diode, and
wherein a dispersion of the resonant frequency is within a range of $(1/2)^{1/2}$ times to $2^{1/2}$ times.

8. The power converter according to claim 7, wherein the arm circuit is mounted on an insulated substrate, and a chip area of the first diode is different from that of the second diode.

9. The power converter according to claim 7, wherein the arm circuit is mounted on an insulated substrate, the first diode and the second diode include a plurality of diode chips respectively, and a chip area of the first diode is different from that of the second diode.

10. The power converter according to claim 7, wherein capacitors whose capacitances are different from one another are connected to the first diode and the second diode in parallel respectively.

11. The power converter according to claim 7, wherein the first diode and the second diode are Schottky barrier diodes comprised of materials whose bandgaps are larger than that of a silicon.

12. The power converter according to claim 11, wherein the material comprises one of a silicon carbide or a gallium nitride.

\* \* \* \* \*